UNITED STATES PATENT OFFICE.

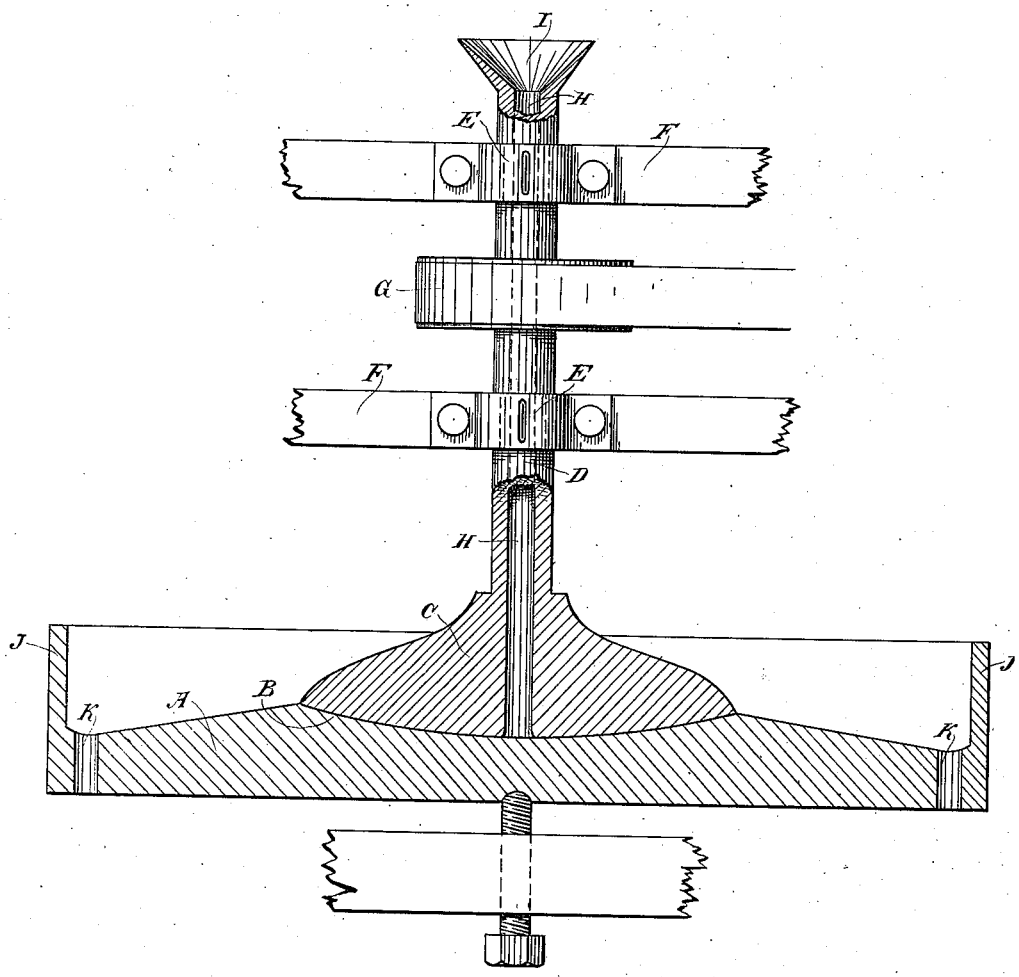

JACOB P. ENGLE, OF SAN FRANCISCO, CALIFORNIA.

SEPARATION OF WASTE PRODUCTS OF PETROLEUM DISTILLATION.

SPECIFICATION forming part of Letters Patent No. 481,392, dated August 23, 1892.

Application filed December 11, 1891. Serial No. 414,741. (No specimens.)

*To all whom it may concern:*

Be it known that I, JACOB P. ENGLE, a citizen of the United States, residing in the city and county of San Francisco, State of California, have invented an Improvement in the Separation of Waste Products of Petroleum Distillation; and I hereby declare the following to be a full, clear, and exact description of the same.

My invention relates to the separation of waste products of petroleum distillation, consisting of water and heavy oily matters, from each other; and my invention consists of the improved process which I shall hereinafter fully describe and claim.

The figure shows one form of apparatus which may be employed for this purpose.

In the distillation of petroleum or hydrocarbon oils for the purpose of manufacturing gas there remains a residue after the lighter portions are distilled away. This residue consists of water and heavy oil, which differs considerably from the tar which forms the residue of coal distillation. The characteristic of this petroleum residue is a tough, elastic, oily consistency, which causes it to envelope and cover small globules or particles of the water with which it is mixed, with such persistency that it is impossible to separate the two by heating or any ordinary known process.

In my invention I employ any apparatus in which two surfaces are constantly rubbed together, while the mixture is fed between them so that the mechanical rubbing acts to separate the heavy oil from the water and allow the latter to flow off separately from it.

Various forms of apparatus may be employed for this purpose. In order to illustrate it I have shown a form in the present case consisting of a base A, of any suitable or convenient shape, having a surface B, which may be flat or preferably slightly concaved.

C is a disk having the lower surface adapted to fit accurately upon the surface B. This disk is mounted upon a shaft D, which is journaled to turn in boxes E, fixed to suitable supporting-timbers F.

G is a pulley around which passes a belt driven from any suitable source of power, and by means of this pulley the shaft E and disk C are rotated.

The shaft D is made hollow, as shown at H, so that the combined oil and water may be delivered in at its upper end by means of a funnel I, or any other suitable arrangement. The material flows down through the passage H and is delivered between the surfaces at B, where the constant rubbing action causes the coating of heavy oil to be separated from the water, and the two gradually escape around the periphery of the disk C, flowing outwardly and being delivered in any suitable manner.

The base A may be surrounded, as shown in the present case, by a rim J, and openings K are made through the base A, through which the oil and water are allowed to escape and from which they are delivered into any suitable receptacle.

When this separation has once been made as here described, the oil will remain separate from the water, and, being slightly heavier, will gradually sink to the bottom, so that the water may be drawn off from the top, leaving the oil nearly or quite clear of watery mixture. The oil thus separated may be used directly as a fuel or mixed with any dry refuse material which will absorb it, and form a permanent fuel for future use, or it may be employed for any other purposes for which it is fit.

Having thus described my invention, what I claim as new, and desire to secure by Letters Patent, is—

The process of separating the heavy oil arising from petroleum distillation from the water with which it is mixed, consisting, essentially, in imparting to the material a rubbing action to break up the globules and separate the water from the oil, substantially as herein described.

In witness whereof I have hereunto set my hand.

JACOB P. ENGLE.

Witnesses:
S. H. NOURSE,
H. F. ASCHECK.